US005199692A

United States Patent [19]

Kimura et al.

[11] Patent Number: 5,199,692

[45] Date of Patent: Apr. 6, 1993

[54] CLAMP DEVICE DRIVE APPARATUS

[75] Inventors: Seiji Kimura, Toyono; Kouji Wada, Itami, both of Japan

[73] Assignee: Aioi Seiki, Inc., Hyogoken, Japan

[21] Appl. No.: 673,536

[22] Filed: Mar. 22, 1991

[30] Foreign Application Priority Data

Mar. 24, 1990 [JP] Japan ............................ 2-30024[U]
Nov. 30, 1990 [JP] Japan ............................ 2-130486[U]

[51] Int. Cl.[5] .............................................. B23G 1/20

[52] U.S. Cl. ...................................... 269/55; 269/58; 269/61; 269/35

[58] Field of Search ...................... 269/55, 56, 58, 61, 269/20, 35, 32; 74/89.15; 92/31-33, 165 P R

[56] References Cited

U.S. PATENT DOCUMENTS

| | | | |
|---|---|---|---|
| Re. 17,473 | 10/1929 | Helmholtz et al. | 92/31 |
| 679,421 | 7/1901 | Halsey | 92/31 |
| 2,932,206 | 4/1960 | Tootle | 74/89.15 |
| 3,162,098 | 12/1964 | Lindberg | 74/89.15 |
| 3,192,783 | 7/1965 | Cruzan | 74/89.15 |
| 3,377,711 | 4/1968 | Wempe | 269/55 |
| 3,850,420 | 11/1974 | Marceau et al. | 269/55 |
| 4,202,231 | 5/1980 | Striebis | 269/55 |
| 4,890,655 | 1/1990 | Zweig | 269/56 |

FOREIGN PATENT DOCUMENTS

| | | | |
|---|---|---|---|
| 54-120338 | 9/1979 | Japan . | |
| 60-56101 | 1/1985 | Japan . | |
| 62-46508 | 12/1987 | Japan . | |
| 63-25899 | 5/1988 | Japan . | |
| 1-28901 | 1/1989 | Japan . | |
| 2-8573 | 2/1990 | Japan . | |
| 0837731 | 6/1981 | U.S.S.R. | 269/55 |

*Primary Examiner*—J. J. Swann
*Attorney, Agent, or Firm*—Evenson, McKeown, Edwards & Lenahan

[57] ABSTRACT

A clamp device drive apparatus for driving a clamp device engaged with a T-shaped groove slidably between a clamping position and an unclamping position, comprises a push-pull chain connected to a clamp device, a vertical housing for containing the chain, guide members for turning a running course of the chain, a sprocket engaged with the chain, and a cylinder drive type motor for driving the sprocket to rotate, and the motor is constituted to drive the sprocket with a double acting fluid cylinder or a pair of single acting fluid cylinder, through ball screw mechanism for converting driving force into driving torque.

3 Claims, 9 Drawing Sheets

CLAMP DEVICE DRIVE APPARATUS

BACKGROUND OF THE INVENTION

The present invention relates to a clamp device drive apparatus for driving a clamp device for clamping an object (workpiece or tool etc.) to be clamped on a base member of a press machine or machining machine.

In the industrial field, the clamp device drive apparatus is known and applied in order to drive the clamp device between a clamping position for clamping the object such as a die and workpiece, and an unclamping position away from the object along a T-shaped groove formed horizontally on a surface of the base member of the machine.

Generally, the clamp device drive apparatus comprises a push-pull chain connected to the clamp device at its one end and capable of pushing and pulling it along the T-shaped groove, a sprocket engaged with the push-pull chain and supported rotatably with a shaft, and a drive motor for rotating the sprocket.

In the prior clamp device drive apparatus, two types of the drive motors for rotating the sprocket, one employing an electric motor with reduction gears, the other employing a hydraulic or pneumatic motor, are applied.

With regard to several defects of these prior drive motors, the former is rather large in size, therefore it can not be mounted in a limited space around the machine, and the reduction gears are expensive in manufacturing cost, its drive torque can not be easily changed corresponding to the weight and size of the clamp device, the latter is not free from such defects that its torque is small and its rotation can not be stabilized in low rotating speed, especially in starting.

In order to generate high torque in low rotating speed, the motor should include reduction gears, but reduction gears can not be recommended because of high cost.

Accordingly, it is possible to apply various cylinder drive type motors employing pressurized fluid, which are relatively small in size and capable of generating high torque in low rotating speed.

For examples, in Japanese Patent Laid-open Publication No. 54-120, 338 or Japanese Patent Laid-open Publication No. 60-56, 101 proposed by the applicant of the present invention, cylinder drive type motors with a rack-pinion mechanism for converting a driving force of a pneumatic cylinder into rotating torque are disclosed. In Japanese Patent Application No. 2-151, 262, the applicant of the present invention proposed a cylinder drive type motor with a crank mechanism for converting the driving force of a pneumatic cylinder into rotating torque.

However, in these cylinder drive type motors with the rack-pinion or crank mechanism, it is necessary to provide a long rack member or connecting rod member on the piston rod of the pneumatic cylinder. Therefore, it is impossible to miniaturize the motor size and to decrease the number of necessary parts for the rack-pinion or crank mechanism and to save the manufacturing cost.

SUMMARY OF THE INVENTION

The first object of the present invention is to miniaturize the drive motor for rotating the sprocket so as to mount the clamp device drive apparatus in a limited space around the machine. The second object is to simplify the configuration of the drive motor so as to save the manufacturing cost.

The clamp device drive apparatus according to the present invention comprises a push-pull chain connected to the clamp device at its one end, a housing for containing the push-pull chain, a guide member provided in the housing for guiding the push-pull chain, a sprocket engaged with the push-pull chain in the housing and supported rotatably with a shaft, and a drive motor for driving the sprocket to rotate.

The drive motor comprises a pressurized fluid cylinder including a piston member capable of being driven selectively forward and backward, a rotation restraining mechanism for restraining rotation of the piston member, and a screw mechanism including a screw nut fixed inside the piston member in parallel with the axis thereof and a screw shaft engaged with the screw nut and fixed to the shaft at one end thereof.

The modified drive motor comprises a screw nut fixed in an axial bore formed inside the sprocket, a screw shaft extending through and engaged with the screw nut, a first pressurized fluid cylinder of single acting type, mounted fixedly on the housing on one end side of the screw shaft, for pushing the screw shaft toward the other end thereof, a second pressurized fluid cylinder of single acting type, mounted fixedly on the housing on the other end side of the screw shaft, for pushing the screw shaft toward the one end thereof, and a rotation restraining mechanism for restraining rotation of the screw shaft.

BRIEF DESCRIPTION OF DRAWINGS

The drawings show the embodiments of the present invention, wherein.

DETAILED DESCRIPTION OF THE PREFERRED EMBODIMENTS

Hereinafter, preferred embodiments of the present invention will be described with reference to the accompanying drawings.

FIRST EMBODIMENT

FIG. 1 to FIG. 10

A clamp device drive apparatus according to this embodiment is applied to such an apparatus for driving a clamp device for clamping a die of a press machine.

Figure 1:
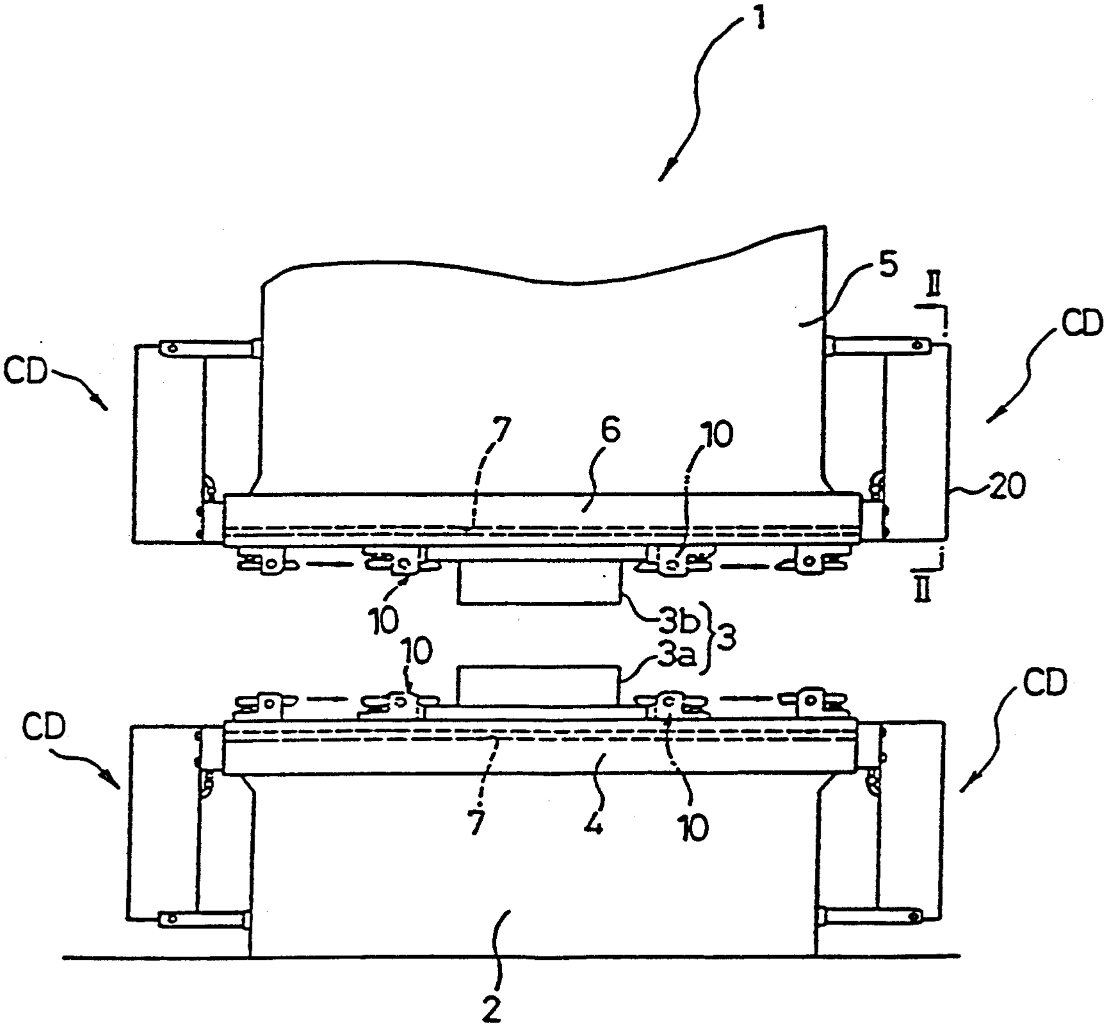
FIG. 1 is a front view of a press machine.

Firstly, the press machine 1 will be described shortly. As shown in FIG. 1, the base 2 of the vertical press machine 1 is provided with a fixed die holder 4 for disposing the lower die 3*a* of the die 3, and the slide 5 of the press machine 1 is provided with a movable die holder 6 for disposing the upper die 3*b* of the die 3 on its lower end surface.

On the surface of the fixed die holder 4 and the movable die holder 6, two horizontal T-shaped grooves 7 are formed from right to left, respectively, and respective T-shaped groove 7 of the fixed die holder 4 is provided with two clamp devices 10 for clamping the lower die 3*a*, and respective T-shaped groove 7 of the movable die holder 6 is provided with two clamp devices 10 for clamping the upper die 3*b*.

On each of the right and left side wall of the fixed die holder 4 and the movable die holder 6, two sets of the clamp device drive apparatuses CD are mounted corresponding to the T-shaped groove 7, respectively. Respective clamp device drive apparatus CD drives the clamp device 10 between an unclamping position, shown in full lines, and a clamping position, shown in two-dotted lines.

Next, the clamp device 10 will be described.

Figure 2:
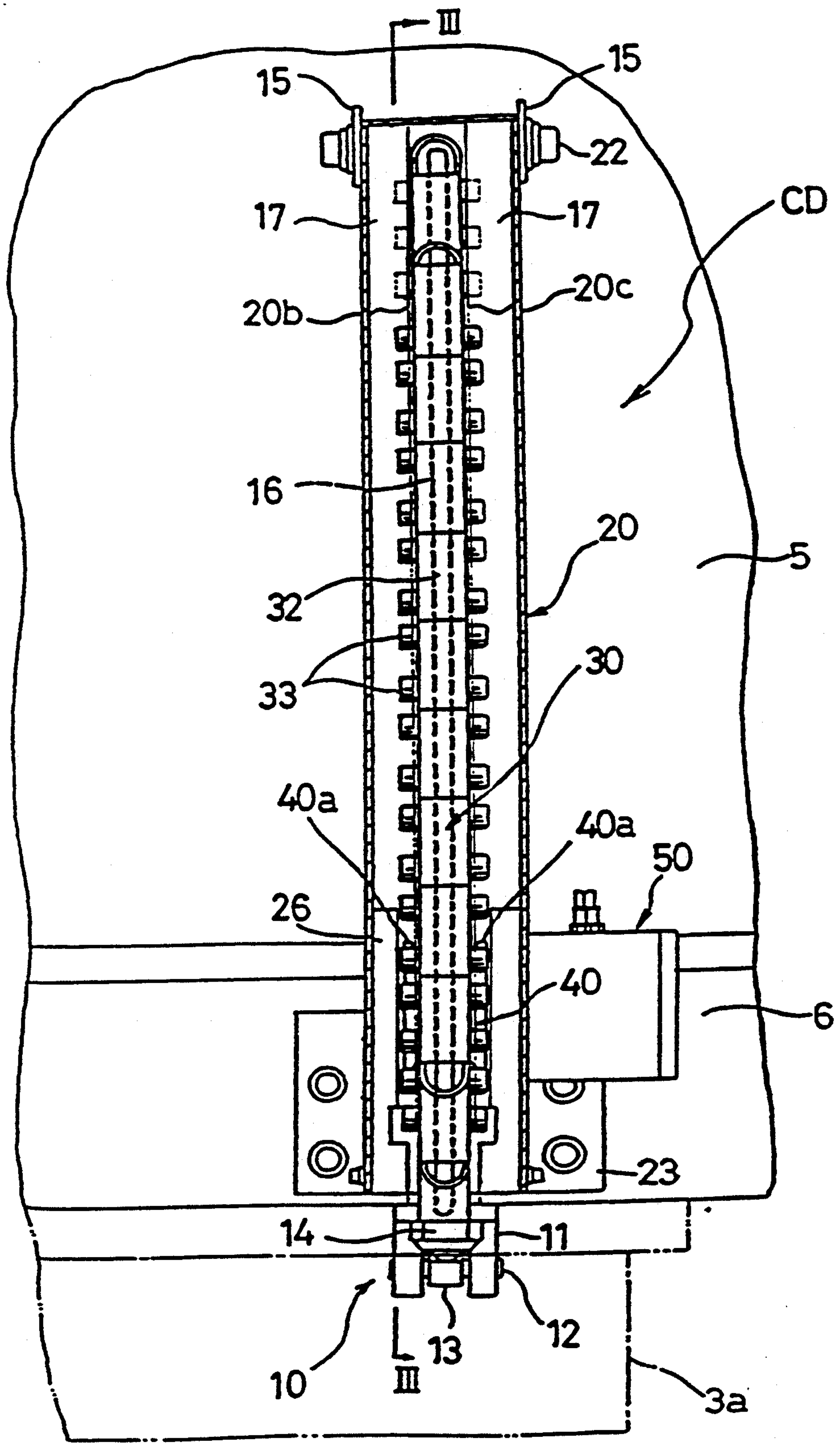
FIG. 2 is a sectional view taken along the plane of lines II—II of FIG. 1.
Figure 3:
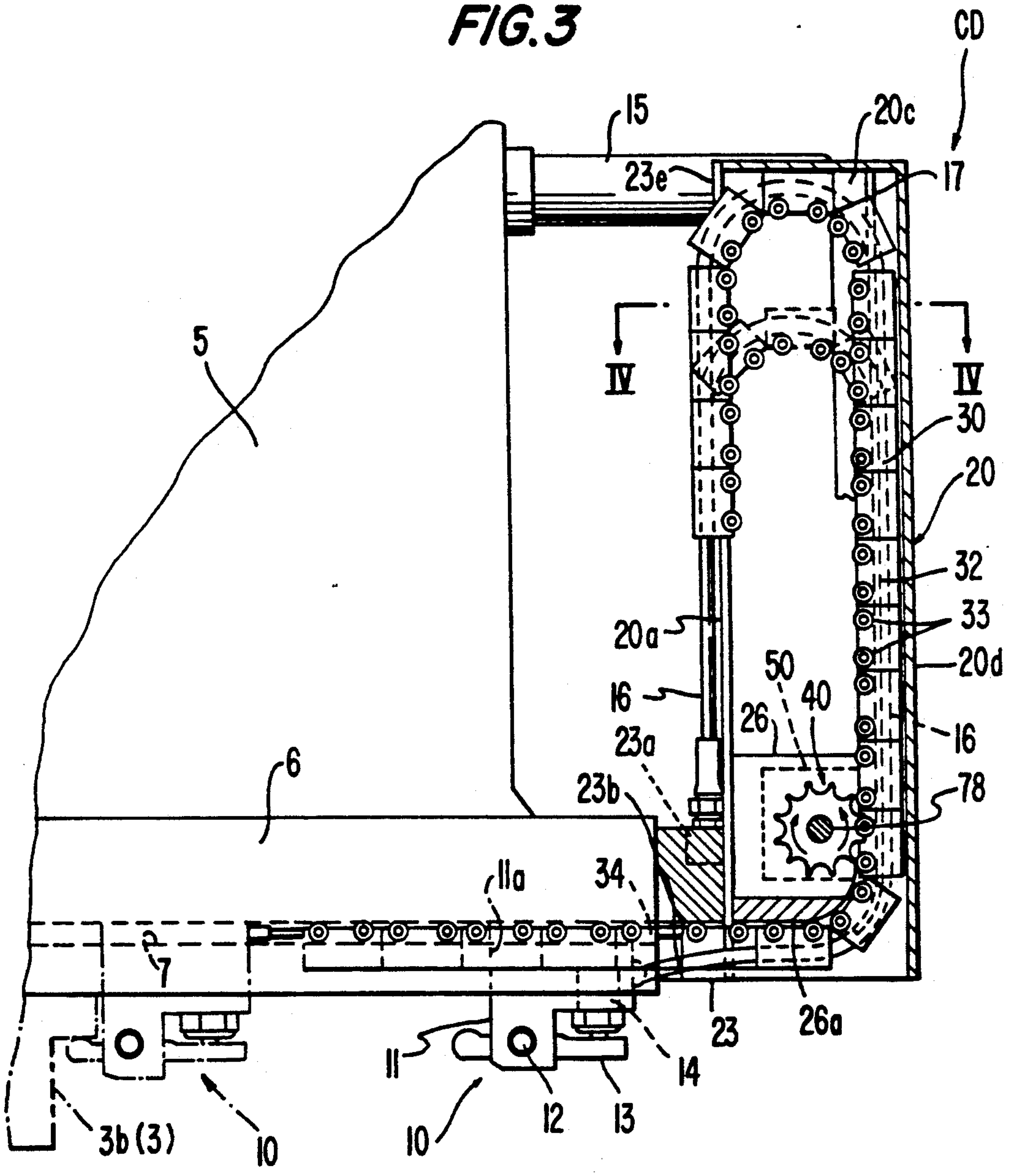
FIG. 3 is a sectional view taken along the plane of lines III—III of FIG. 2.

As shown in FIG. 2 and FIG. 3, the clamp device 10 comprises, a main body 11, a pivot 12 attached horizontally to the main body 11, a clamp lever 13 mounted movably on the main body 11 through the pivot 12, and a hydraulic cylinder 14 for driving the clamp lever 13. The foot portion 11*a* of the main body 11 is engaged with the T-shaped groove 7, movably along it.

Next, the clamp device drive apparatus CD will be described. Since the configuration of these clamp device drive apparatuses CD are same, the description will be made on one of the clamp device drive apparatuses CD which is mounted on the right side wall of the movable die holder 6 with reference to FIG. 2 to FIG. 6.

The clamp device drive apparatus CD comprises, a vertically elongated housing 20 disposed on the right side of movable die holder 6, a push-pull chain 30 introduced into the T-shaped groove 7 from within the housing 20 and connected to the foot portion 11*a* of the main body 11 of the clamp device 10 at its forward end, a sprocket 40 disposed rotatably in the lower portion of the housing 20 and engaged with the push-pull chain 30, and a cylinder drive type pneumatic motor 50 for rotating the sprocket 40.

The openings 20*a* of the housing 20 is formed so as to face with the slide 5, and as shown in FIG. 2 and FIG. 3, a block member 23 secured to the lower side portion of the housing 20 is fixed abuttingly to the right side wall of the movable die holder 6 with bolts 25 and the upper ends of the front wall 20*b* and rear wall 20*c* of the housing 20 are fixed to brackets 15 secured to the slide 5 with bolts 22, respectively.

The block member 23 is provided with an oil port 23*a* connected with a hydraulic supply source (not shown) and a guide groove 23*b* of same cross section as that of the T-shaped groove 7. The guide groove 23*b* is communicated with an end of the T-shaped groove 7.

Figure 4:
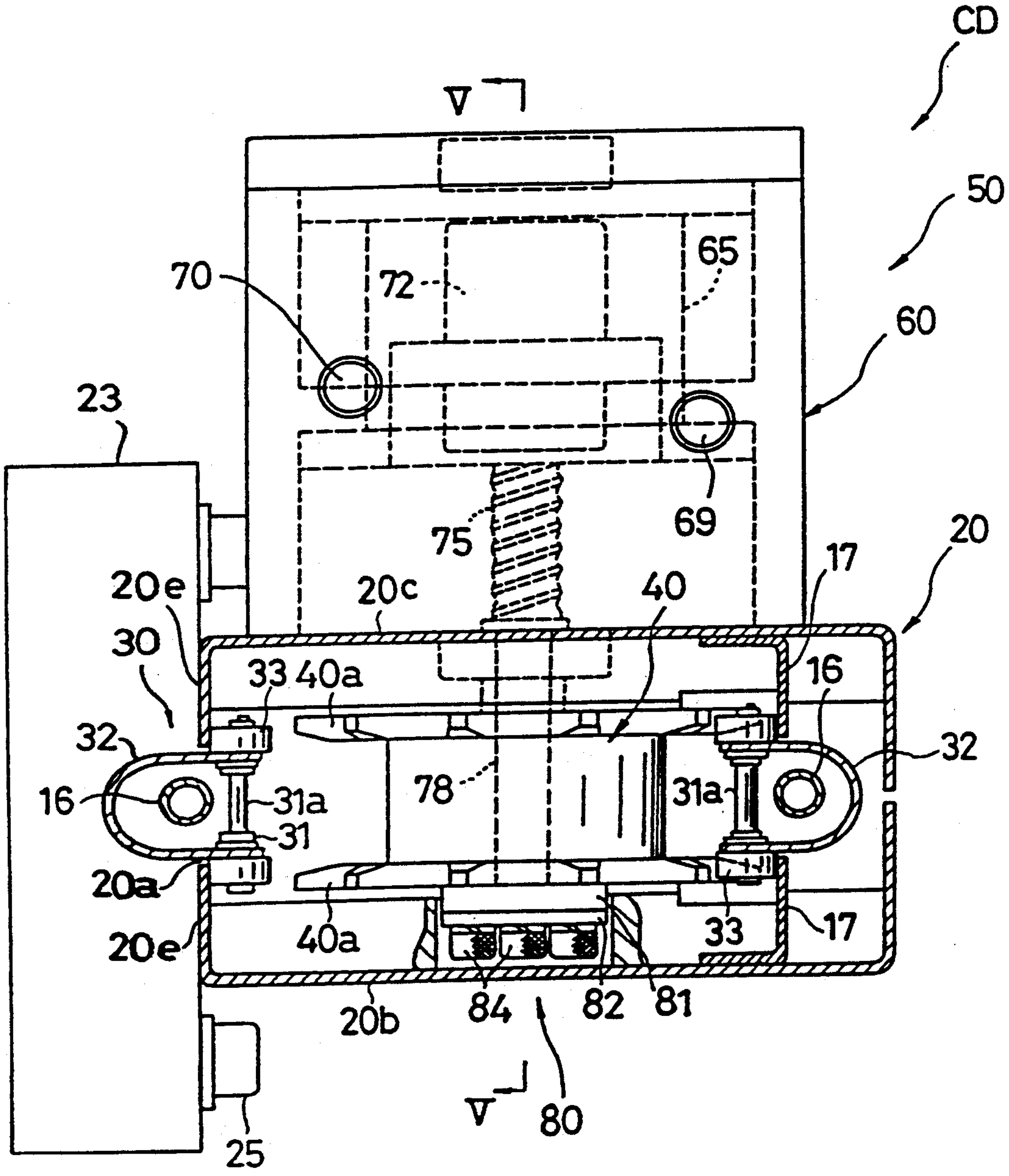
FIG. 4 is a sectional view taken along the plane of lines IV—IV of FIG. 3.

The push-pull chain 30 is for pushing and pulling the clamp device 10 between the unclamping position and the clamping position. As shown in FIG. 2 to FIG. 4, in principle, the push-pull chain 30 is made up of a chain 31 and a plurality of U-shaped guide members 32 and a plurality of free rollers 33. The push-pull chain 30 comprises small free rollers 33 on opposite ends of respective coupling pins 31*a* and a plurality of U-shaped link plates 32 each of which is formed integrally with pairs of half link plates, and these U-shaped link plates 32 form a guide passage for an oil hose 16, and the sprocket 40 comprises a pair of sprocket portions 40*a* each of which is engaged with the free rollers 33 of the push-pull chain 30 along with other sprocket positions. The forward end of the push-pull chain 30 is connected to the clamp device 10 with a connecting member 34.

As shown in FIG. 3 and FIG. 4, guide members 17 for guiding the free rollers 33 are mounted on the inner surface of the front wall 20*b* and rear wall 20*c* of the housing 20, respectively, and guide portions 20*e* for guiding the free rollers 33 positioning at opposite ends of the opening 20*a* are formed at the left end of the front wall 20*b* and rear wall 20*c*, respectively. The push-pull chain 30 is turned along U curve at its upper portion, the left side portion from the U-curved portion of the push-pull chain 30 is guided by the guide portions 20*e*, the right side portion from the U-curved portion is guided by the guide members 17, and at the lower end of the guide member 17 the push-pull chain 30 is introduced into the guide groove 23*b* of the block member 23 through a guide groove 26*a* in a support block member 26 secured to the lower portion of the housing 20.

Inside the push-pull chain 30, disposed is a flexible oil hose 16 along a guide tunnel passage inside the link plates 32, one end of the hose 16 is connected to the oil port 23*a* and the other end is connected to the main body 14 of the clamp device 10, so that hydraulic oil is supplied to or exhausted from the hydraulic cylinder 14.

Figure 5:
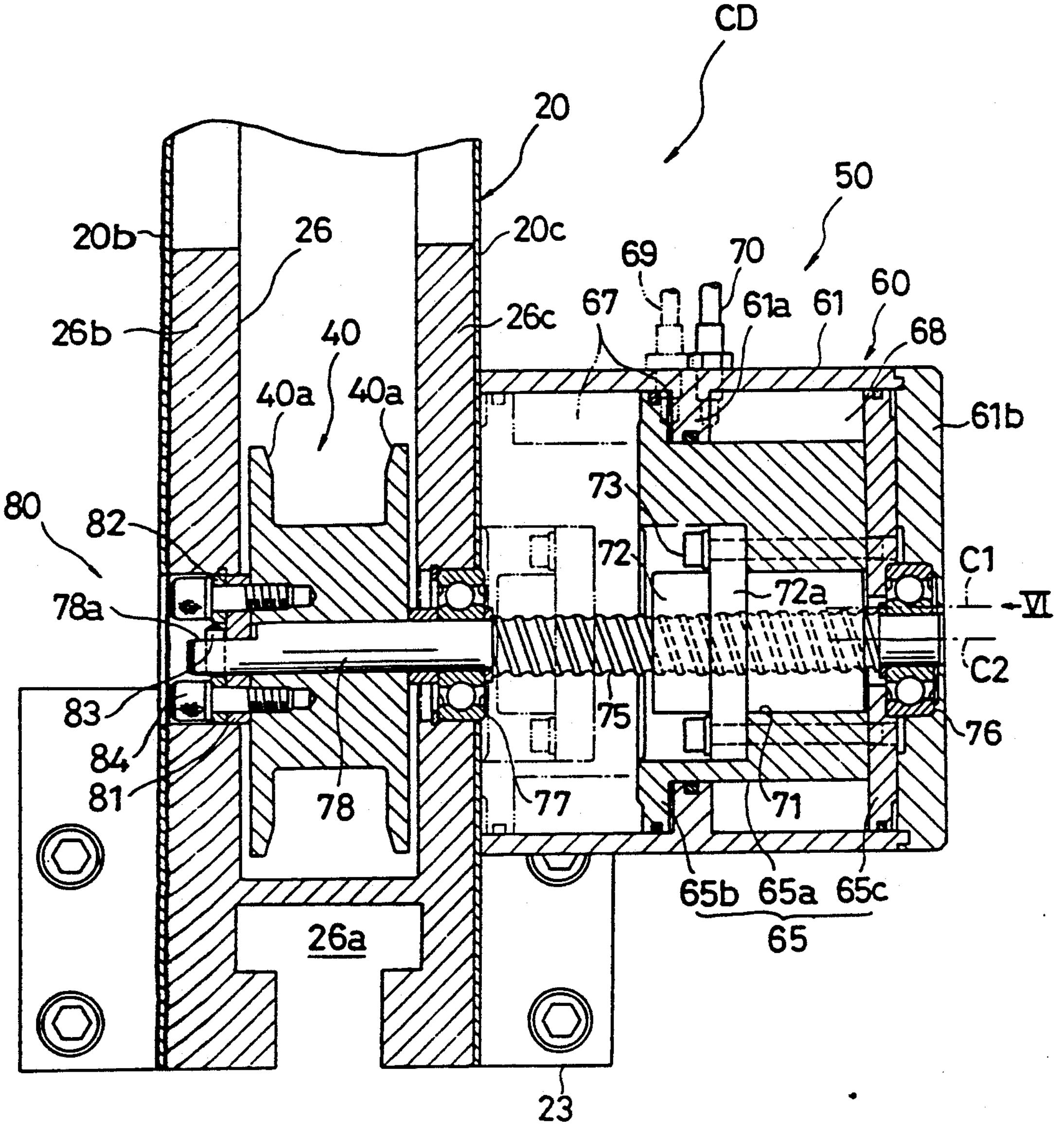
FIG. 5 is a sectional view of a cylinder drive type motor.

The sprocket 40 is disposed between the front wall 26*b* and rear wall 26*c* of the support block member 26 and is mounted on an output shaft 78 of the motor 50. The sprocket 40 and the output shaft 78 are connected disengagedly through a coupling mechanism 80. As shown in FIG. 4 and FIG. 5, the sprocket 40 comprises a pair of sprocket portion 40*a* engaged with free rollers 33 of the push-pull chain 30.

Next, the cylinder drive type pneumatic motor 50 will be described.

Figure 6:
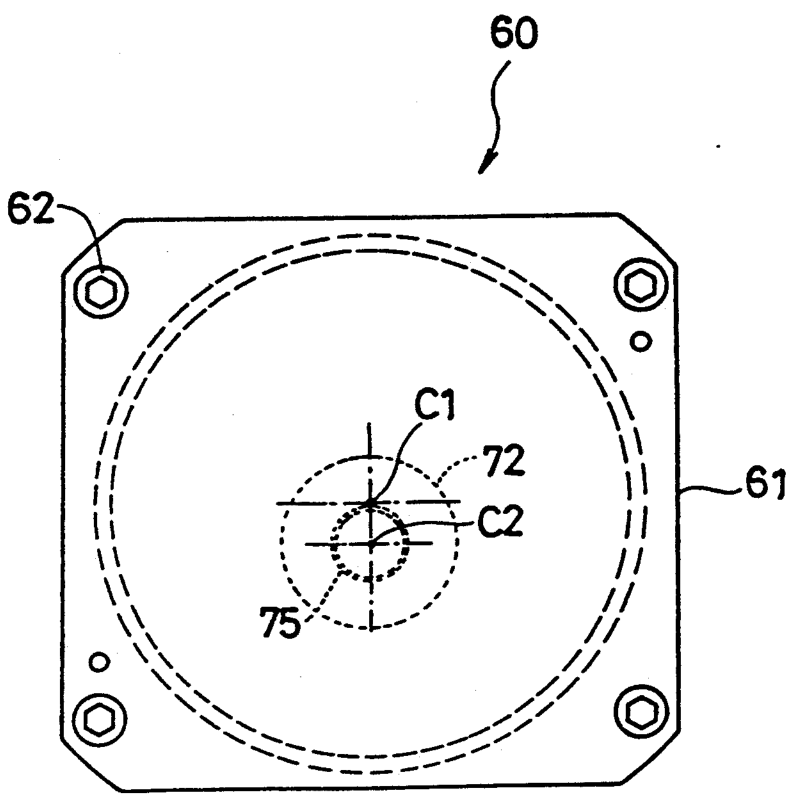
FIG. 6 is a side view of the cylinder drive type motor in view of the arrow VI.
Figure 7:
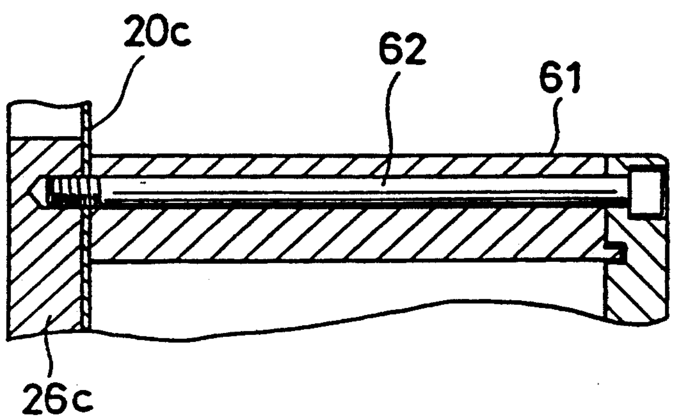
FIG. 7 is a partially sectional view of the cylinder drive type motor.
Figure 8:
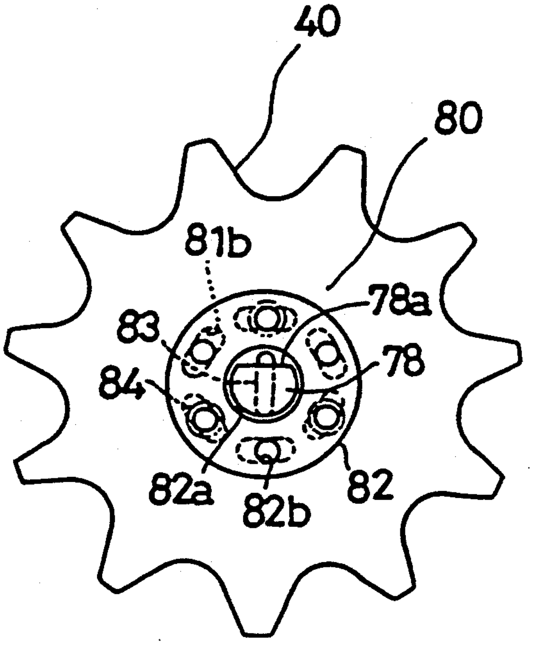
FIG. 8 is a front view cf a coupling mechanism.
Figure 9:
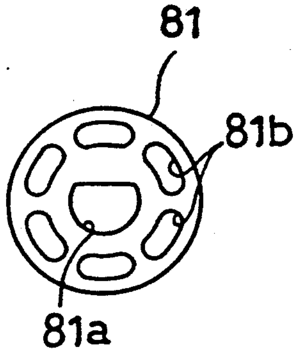
FIG. 9 is a front view of a first fixing member.
Figure 10:
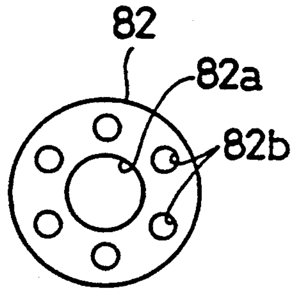
FIG. 10 is a front view of a second fixing member.

The motor 50 is disposed outside of the rear wall 20*c* of the housing 20. As shown in FIG. 6 and FIG. 7, the motor is mounted fixedly on the rear wall 26*c* of the support block member 26 with four bolts 62 extending through a cylinder body 61 of a double acting (reciprocative) pneumatic cylinder 60 which is particular in structure.

Inside the cylinder body 61, disposed is a piston member 65 comprising a main body portion 65*a* of smaller diameter than the inside diameter of the cylinder body 61, first and second piston portions 65*b* . 65*c* formed at the front and rear ends of the main body portion 65*a*, respectively. An annular partition wall 61*a* contacting slidably with the surface of the main body portion 65*a* is formed at the middle inside portion of the cylinder body 61, and thus, in the cylinder body 61, a first chamber 67 is formed between the first piston portion 65*b* and the partition wall 61*a* and a second chamber 68 is formed between the second piston portion 65*c* and the partition wall 61*a*.

Air hoses 69 . 70 for supplying pressurized air to the first and second chambers 67 . 68, respectively, are connected to the cylinder body 61. When pressurized air is supplied to the first chamber 67, the piston member 65 is driven to an advanced position, shown in FIG. 5 in two-dotted lines, from a retracted position, shown in FIG. 5 in full lines, and when pressurized air is supplied to the second air chamber 68, the piston member 65 is driven to the retracted position from the advanced position.

Next, an converting mechanism for converting the driving force of the pneumatic cylinder 60 into rotating torque for rotating the sprocket 40 will be described.

As shown in FIG. 5 and FIG. 6, an eccentric axial bore 71 being off-centered from the axis C1 of the piston member 65 is formed inside the piston member 65, a ball screw nut 72 is inserted into the eccentric axial bore 71 with its axis C2 in parallel with and off-centered from the axis C1. The ball screw nut 72 is fixed to the piston member 65 at its annular portion 72*a* with bolts 73.

A ball screw shaft 75 is extending through and engaged with the ball screw nut 72, the rear end of the ball screw shaft 75 is supported rotatably on a bearing 76 mounted in the wall 61*b* of the cylinder body 61, the front end of the ball screw shaft 75 extending forward than the cylinder body 61 is supported rotatably on a bearing 77 mounted in the rear wall 26*c* of the support block member 26, and an output shaft 78 is integrally formed with the front end of the ball screw shaft 75.

When the piston member 65 is driven to the advanced position, the ball screw shaft 75 and output shaft 78 are forced to rotate through the ball screw nut 72, and concurrently the sprocket 40 is forced to rotate clockwise through the coupling mechanism 80, as shown in FIG. 3, thereby the clamp device 10 is driven to the clamping position where the die 3 is clamped by the clamp device 10 through the push-pull chain 30. To the contrary, when the piston member 65 is driven to the retracted position, the sprocket 40 is forced to rotate counterclockwise, as shown in FIG. 3, thereby the clamp device 10 is driven in the opposite direction to the unclamping position.

Next, the coupling mechanism 80 will be described. The coupling mechanism 80 is provided for transmitting the torque of the output shaft 78 to the sprocket 40 and for adjusting the advanced position, that is, the clamping position of the clamp device 10, corresponding to the size of the lower die 3*a* or the upper die 3*b*.

As shown in FIG. 5 and FIG. 8 to FIG. 10, a cutout shaft portion 78*a* is formed at the front end of the output shaft 78 near the front end surface of the sprocket 40 by cutting it out partially with an engaging surface, first fixing member 81, having an aperture 81*a* with which the cutout shaft portion 78*a* engages and six curved elongated bolt holes 81*b* formed at an interval of 60°, is positioned at the front surface of the sprocket 40, and a second fixing member 82, having an aperture 82*a* through which the cutout shaft portion 78*a* is extended with clearance therebetween and bolt holes 82*b* formed at an interval of 60°, is positioned at the front surface of the first fixing member 81. In addition, reference numerals 83 and 84 indicate a pin for preventing the fixing member 81 from slipping off the cutout shaft portion 78*a* and a bolt, respectively.

After installation of the clamp device 10 and the clamp device drive apparatus CD, when adjusting the advanced position of the clamp device 10, firstly the piston member 65 of the motor 50 is positioned in the advanced position, then, without inserting bolts 84 into the bolt holes 81*b* . 82*b*, the sprocket 40 is rotated relatively to the output shaft 78 to adjust the clamping position of the clamp device 10, and then the first and second fixing members 81 . 82 are fixed to the sprocket 40 with the bolts 84.

By means of fixing the first and second fixing members 81 . 82 to the sprocket 40, the sprocket 40 is fixed to the output shaft 78, thereby it does not rotate relatively to the output shaft 78, and the torque of the output shaft 78 is transmitted to the sprocket 40 through the first and second fixing members 81 . 82 and the bolts 84. In addition, in case of adjusting the advanced position slightly, the advanced position of the clamp device 10 is adjusted slightly by making the bolts 84 loosened, then first and second fixing members 81 . 82 are fastened with the bolts 84 again.

Next, the function of the clamp device drive apparatus CD and the motor 50 will be described.

In case of driving the clamp device 10 to the clamping position from the unclamping position, when the piston member 65 is driven to the advanced position from the retracted position together with the ball screw nut 72 by supplying pressurized air to the first chamber 67, the ball screw shaft 75 and output shaft 78 are forced to rotate, thereby the sprocket 40 is forced to rotate clockwise through the coupling mechanism 80.

Since the ball screw nut 72 is mounted inside the piston member 65 with its axis C2 being off-centered from the axis C1 of the piston member 65, the piston member 65 does not rotate inside the cylinder body 61, the driving force of the cylinder 60 is converted into the torque for rotating the ball screw shaft 75.

When sprocket 40 is driven to rotate, the push-pull chain 30 engaged with the sprocket 40 is driven downwardly while pushing the clamp device 10 toward the clamping position, as shown in FIG. 3 in two-dotted lines. When the piston member 65 reaches the advanced position, the clamp device 10 also reaches the clamping position, then supplying of pressurized air to the first chamber 67 is stopped.

On the other hand, in case of driving the clamp device 10 to the unclamping position from the clamping position, when pressurized air is supplied to the second chamber 68, the sprocket 40 is forced to rotate counterclockwise, the push-pull chain 30 is driven upwardly into the housing 20 while pulling the clamp device 10 toward the unclamping position. When the piston member 65 reaches the retracted position, the clamp device 10 also reaches the unclamping position, then supplying of pressurized air to the second chamber 68 is stopped.

As described above, since the cylinder drive type pneumatic motor 50 is comprising the double acting pneumatic cylinder 60, the ball screw mechanism including the ball screw nut 72 and the ball screw shaft 75, and the output shaft 78, and the motor 50 can be simplified remarkably in constitution and miniaturized in size. Furthermore, since the ball screw mechanism is mounted inside the cylinder 60 with its axis C1 being off-centered from the axis C1 of the piston member 65, a rotation retraining mechanism for preventing the piston member 65 from rotating is simplified remarkably, thereby the number of parts can be decreased and the motor 50 can be manufactured at low cost.

Since the first and second chambers 67 . 68 are formed between the first and second piston portions 65*b* . 65*c* and the partition wall 61*a* of the cylinder body 61, respectively, the sealing structure for preventing pressurized air from leaking out of the cylinder 60 can be simplified remarkably and the durability of the motor 50 is improved. Furthermore, it is clearly understood that chambers can be formed in the pneumatic cylinder 60 in the same manner as in conventional double acting cylinders by means of providing the ball screw mechanism with a particular sealing structure.

Furthermore, hydraulic cylinder can be employed instead of the pneumatic cylinder. In addition, it is possible to drive another clamp device different in size and weight by means of changing the pressure of pressurized air to be supplied to the chamber 67 . 68. Furthermore, in the case where the sprocket 40 is mounted on the output shaft 78 so as not to rotate relatively, the coupling mechanism 80 can be omitted.

SECOND EMBODIMENT

FIG. 11

Figure 11:
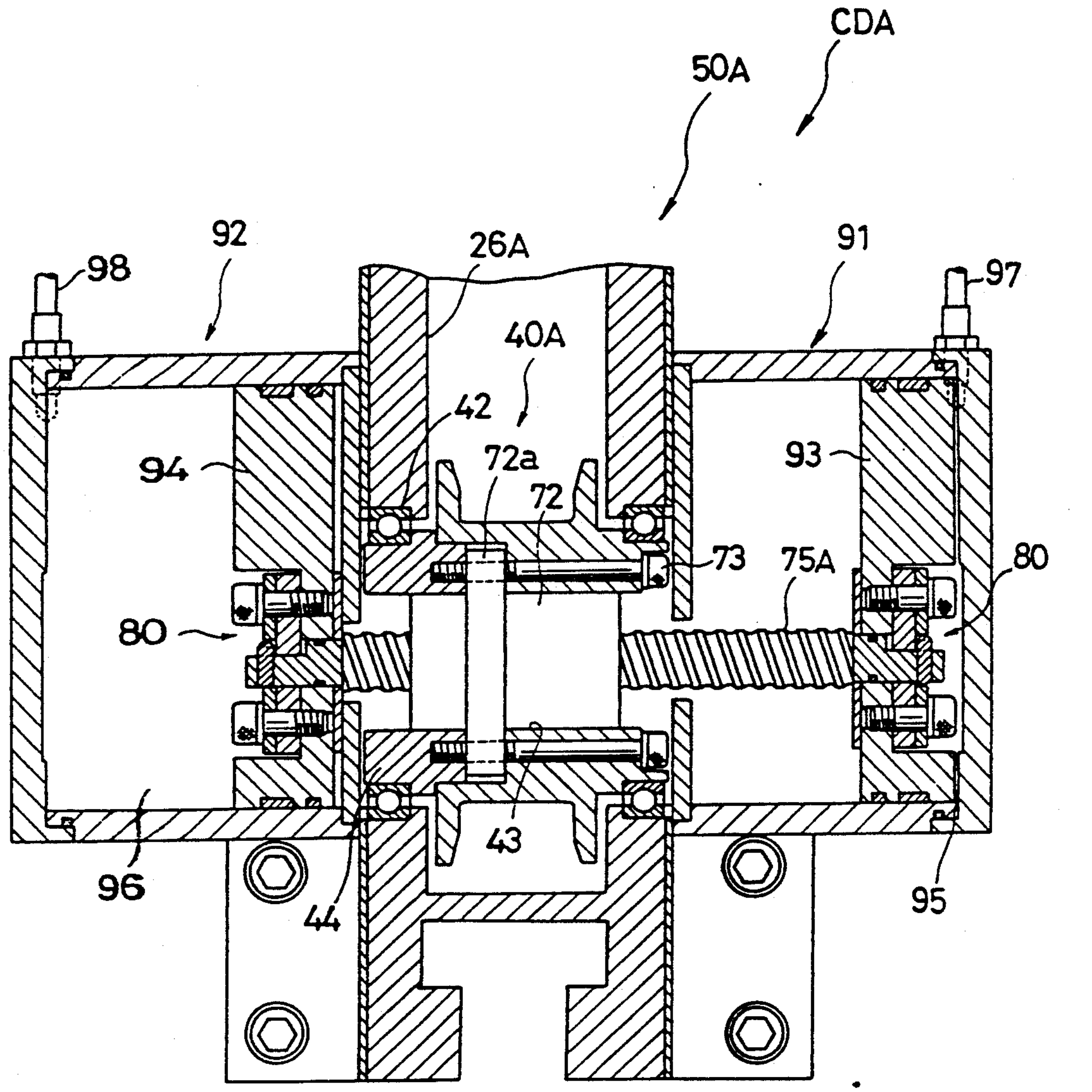
FIG. 11 is a sectional view of a modified cylinder drive type motor.

The clamp device drive apparatus CDA according to this embodiment is basically similar to the clamp device drive apparatus CD of the first embodiment, except the cylinder drive type pneumatic motor 50. In a cylinder drive type pneumatic motor 50A of the clamp device drive apparatus CDA, a pair of single acting pneumatic cylinders are employed instead of cylinder 60 of the motor 50. In FIG. 11, each of same or similar reference numerals denotes same or similar functional element with the first embodiment, of which description will be omitted.

As shown in FIG. 11, a sprocket 40A is mounted rotatably on a support block 26A through bearings 42, the ball screw nut 72 is inserted into an axial bore 43 formed inside the sprocket 40A, the ball screw nut 72 is fixed to the sprocket 40A at its annular portion 72*a* with bolts 73. The ball screw shaft 75 is extending through and engaged with the ball screw nut 72, and the right and left ends of the ball screw shaft 75A extends outsides of the housing 20.

On the right end side and the left end side of the ball screw shaft 75A, a first and second cylinders 91 . 92, each of which is a single acting pneumatic cylinder disposed eccentrically with the ball screw shaft 75A, are provided fixedly on the support block 26A, respectively, and the right and left ends of the ball screw shaft 75A are connected to piston members 93 . 94 of first and second cylinders 91. 92, respectively, through the coupling mechanism 80, so as not to rotate relatively. Air hoses 97 . 98 for supplying pressurized air to chambers 95 . 96 are connected to the first and second cylinders 91 . 92, respectively.

Next, the function of the cylinder drive type motor 50A will be described.

When the piston member 93 or piston member 94 is driven toward the sprocket 40 together with the ball screw shaft 75A by pressurized air in the chamber 95 or chamber 96 selectively, the ball screw nut 72 and sprocket 40 are forced to rotate clockwise or counterclockwise, thereby the clamp device 10 is driven between the clamping position and the unclamping position.

Since the ball screw shaft 75A is disposed eccentrically with the first and second air cylinders 91 . 92, the piston members 93 . 94 do not rotate, the driving force of the first or second cylinder 92 . 93 is converted into the torque for rotating the ball screw shaft 75A and the sprocket 40A. Furthermore, even when unavoidable torque caused by outside load is loaded on the ball screw shaft 75A through the sprocket 40, the coupling mechanism 80 prevents the ball screw shaft 75A from rotating.

Since the motor 50A is made up of two single acting cylinders 91 . 92, the ball screw mechanism including the ball screw nut 72 and the ball screw shaft 75A, and the sprocket 40A as a rotation output member, the motor 50A can be simplified remarkably in constitution and miniaturized in size. Furthermore, since each of cylinders 91 . 92 is disposed eccentrically with the ball screw mechanism, and the piston members 93 . 94 are fixed to the ball screw shaft 75A through the coupling mechanisms 80, respectively, a rotation retraining mechanism for preventing the piston members 93 . 94 from rotating is simplified remarkably. In addition, since conventional pneumatic cylinders can be applied as the cylinders 91 . 92, the manufacturing cost of the motor 50A can be decreased.

Additionally, it is possible to fix both ends of the ball screw shaft 75A integrally to the piston members 93 . 94, respectively.

THIRD EMBODIMENT

FIG. 12 and 13

Figure 12:
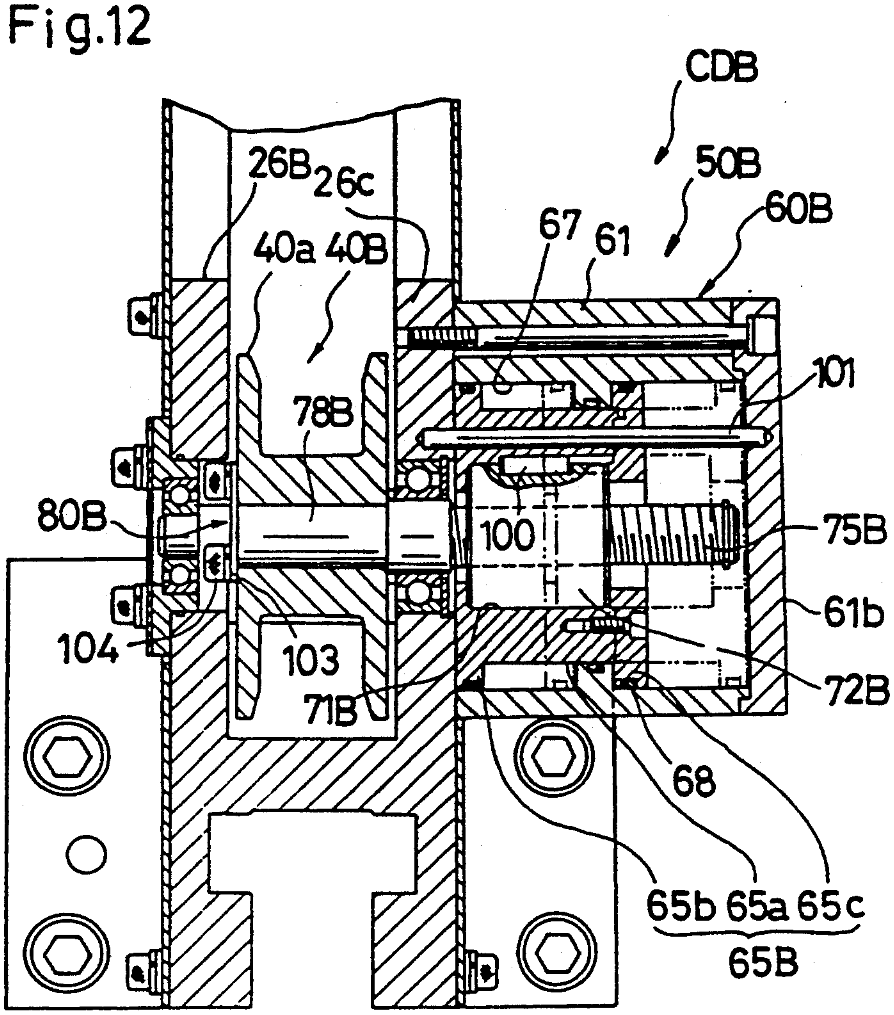
FIG. 12 is a sectional view of an another modified cylinder drive type motor.

The clamp device drive apparatus CDB according to the third embodiment is basically similar to the clamp device drive apparatus CD of the first embodiment, except the cylinder drive type pneumatic motor 50. In FIG. 12, each of same or similar reference numerals denotes same or similar functional element with the first embodiment, of which description will be omitted, and only different features will be described.

As shown in FIG. 12, inside a piston member 65B of a double acting pneumatic cylinder 60B, a concentric axial bore 71B, of which axis is concentric with a axis C1 of the piston member 65B, is formed. A ball screw nut 72B is inserted concentrically into the axial bore 71B and fixed to the piston member 65B with a key 100. A pin member 101 is extending through the piston member 65B and supported at its both ends with the wall 61*b* of the cylinder body 61 and the rear wall 26*c* of a support block member 26B, respectively, thereby the piston member 65B is restrained so as not rotate.

Next, a coupling mechanism 80B will be described.

Figure 13:
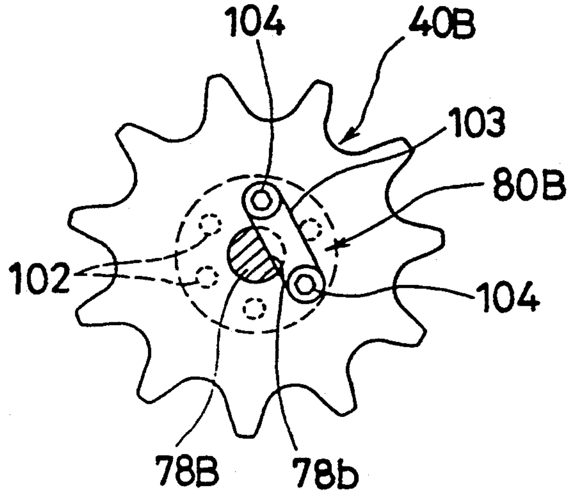
FIG. 13 is a front view of a modified coupling mechanism.

As shown in FIG. 13, a cutout shaft portion 78*b* is formed on left end of an output shaft 78B near the front end surface of the sprocket 40B, and six bolt holes 102 are formed at an interval of 60° on the front end surface of the sprocket 40B. After the clamping position of the clamp device 10 is adjusted and set in the same manner, as previously described, a stopping member 103 is engaged with the cutout shaft portion 78*b*, then the stopping member 103 is fixed to the sprocket 40B with bolts 104. Accordingly, the sprocket 40B do not rotate around the output shaft 78B relatively, and the torque of the output shaft 78B can be transmitted to the sprocket 40 through the stopping member 103 and the bolts 104.

In addition, it is to be understood that the motors 50 50A . 50B can be applied to various apparatuses, for example, such as conveyors or lifters. Therefore, a conventional sprocket, a pulley for driving a belt and a sheave for driving a wire may also be employed as a rotation output member instead of the sprockets 40 . 40A.

What is claimed is:

1. A clamp device drive apparatus for driving a clamped device including a foot portion engaged with a horizontal T-shaped groove formed on a surface portion of a base member on which an object to be clamped is mounted and being disposed movably along the T-shaped groove, between a clamping position where the clamp device clamps the object and an unclamping position away from the object, comprising:

- a push-pull chain introduced into the T-shaped groove from an open end thereof and connected to the foot portion of the clamp device at one end;
- a vertical housing directed along a base structure supporting the base member, for containing the push-pull chain extending from the T-shaped groove, a base end portion thereof being fixed to the side surface of the base member so as to correspond to the T-shaped groove;
- a guide means provided in the housing for guiding the push-pull chain extending into the housing form the open end of the T-shaped groove so as to convert a running course of the push-pull chain by an angle of about 90° in a vertical plane including the T-shaped grooves;
- a sprocket provided in the housing and engaged with the push-pull chain near the guide means, and the sprocket being supported on a shaft capable of rotation integrally with the sprocket; and
- a drive means, mounted on the housing, for driving the sprocket to rotate in both directions of rotation, the drive means comprising, a pressurized fluid cylinder including a piston member driven selectively forward and backward, a rotation restraining means for restraining rotation of the piston member, and a screw mechanism including a ball screw nut fixed inside the piston member in parallel with the axis thereof and a ball screw shaft engaged with the screw nut and fixed to the shaft at one end thereof,
- wherein the piston member of the cylinder comprises a piston main body portion of smaller diameter than the inside diameter of a cylinder body of the cylinder, first and second piston portions formed at opposite ends of the piston main body portion, respectively, and the cylinder body comprises a partition wall contacting slidably with a surface of the piston main body portion between the first and second piston portions, and inside the cylinder body a first fluid chamber is formed between the first piston portion and a partition wall and second fluid member is formed between a second piston portion and the partition wall,
- wherein the ball screw nut and the ball screw shaft are disposed coaxially with the cylinder means, and the rotation restraining means comprises a rod member extending slidably through the piston member and fixed at the opposite ends thereof.

2. A clamp device drive apparatus for driving a clamp device including a foot portion engaged with a horizontal T-shaped groove formed on a surface portion of a base member on which an object to be clamped is mounted and being disposed movably along the T-shaped groove, between a clamping position where the clamp device clamps the object and an unclamping position away from the object, comprising:

- a push-pull chain introduced into the T-shaped groove from an open end thereof and connected to the foot portion of the clamp device at one end;
- a vertical housing directed along a base structure supporting the base member, for containing the push-pull chain extending from the T-shaped groove, a base portion thereof being fixed to the side surface of the base member so as to correspond to the T-shaped groove;
- a guide means provided in the housing for guiding the push-pull chain extending into the housing form the open end of the T-shaped groove so as to convert a running course of the push-pull chain by an angle of about 90° in a vertical plane including the T-shaped grooves;
- a sprocket provided in the housing and engaged with the push-pull chain near the guide means, and the sprocket being supported on a shaft capable of rotation integrally with the sprocket; and
- a drive means, mounted on the housing, for driving the sprocket to rotate in both directions of rotation, the drive means comprising, a pressurized fluid cylinder including a piston member driven selectively forward and backward, a rotation restraining means for restraining rotation of the piston member, and a screw mechanism including a ball screw nut fixed inside the piston member in parallel with the axis thereof and a ball screw shaft engaged with the screw nut and fixed to the shaft at one end thereof,
- wherein the piston member of the cylinder comprises a piston main body portion of smaller diameter than the inside diameter of a cylinder body of the cylinder, first and second piston portions formed at opposite ends of the piston main body portion, respectively, and the cylinder body comprises a partition wall contacting slidably with a surface of the piston main body portion between the first and second piston portions, and inside the cylinder body a first fluid chamber is formed between the first piston portion and a partition wall and second fluid chamber is formed between a second piston portion and the partition wall,
- wherein the ball screw nut and the ball screw shaft are disposed eccentrically with the cylinder means, the rotation restraining means is made up of the eccentric arrangement of the ball screw nut and ball screw shaft, relative to the cylinder.

3. A clamped device drive apparatus for driving a clamp device including a foot portion engaged with a horizontal T-shaped groove formed on a surface portion of a base member on which an object to be clamped is mounted and being disposed movably along the T-shaped groove, between a clamping position where the clamped device clamps the object and an unclamping position away from the object, comprising:

- a push-pull chain introduced into the T-shaped groove from an open end thereof and connected to the foot portion of the clamped device at one end;
- a vertical housing directed along a base structure supporting the base member, for containing the push-pull chain extending from the T-shaped groove, a base end portion thereof being fixed to the side surface of the base member so as to correspond to the T-shaped groove;
- a guide means provided in the housing for guiding the push-pull chain extending into the housing from the open end of the T-shaped groove so as to convert a running course of the push-pull chain by an angle of about 90° in a vertical plane including the T-shaped groove;
- a sprocket provided in the housing and engaged with the push-pull chain, near the guide means, and the sprocket being supported on a shaft capable of rotating integrally with the sprocket; and a drive means for driving the sprocket in both directions of rotation, the drive means comprising a ball screw nut fixed in a axial bore formed inside the sprocket, a ball screw shaft extending through and engaged with the ball screw nut, a first pressurized fluid cylinder means of single acting type, mounted fixedly on the housing on one end side of the ball screw shaft, for pushing the screw shaft toward the other end thereof, a second pressurized fluid cylinder means of single acting type, mounted fixedly on the housing on the other side of the screw shaft, for pushing the screw shaft toward on end thereof, and a rotation restraining means for restraining rotation of the screw shaft, wherein the opposite ends of the screw shaft are connected, through an unrotatable coupling means, to piston members of the first and second pressurized fluid cylinder means, and wherein the ball screw nut and the ball screw shaft are disposed eccentrically with the first and second pressurized fluid cylinder means and the rotation restraining means is made up of the unrotatable coupling means and the eccentric arrangement of the ball screw nut and the ball screw shaft relative to he first and second cylinder means.

* * * * *